Aug. 14, 1962     G. D. BALDWIN     3,049,613
VEHICLE LIGHT
Filed July 18, 1958     2 Sheets-Sheet 1
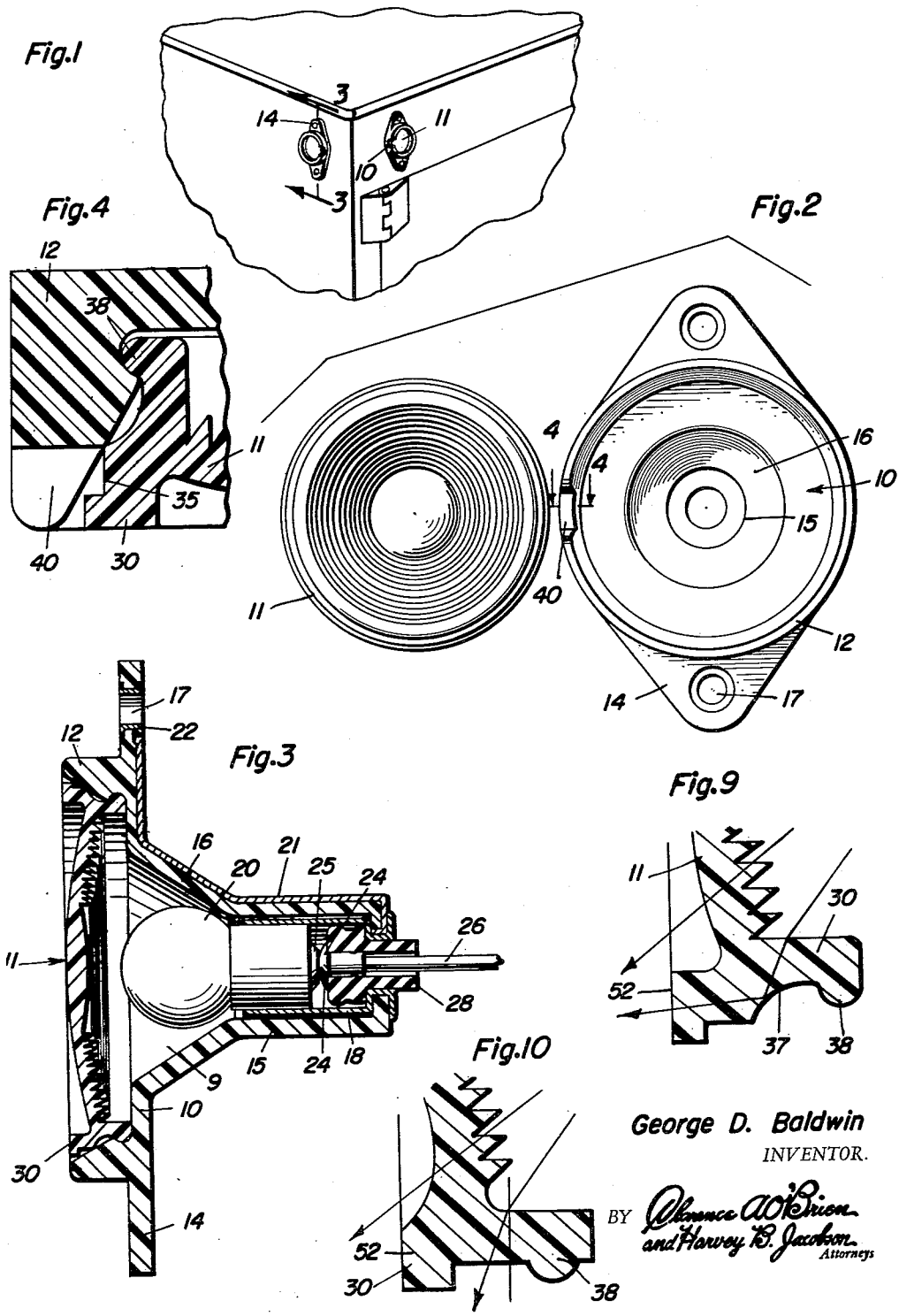
George D. Baldwin
INVENTOR.

Aug. 14, 1962  G. D. BALDWIN  3,049,613
VEHICLE LIGHT

Filed July 18, 1958  2 Sheets-Sheet 2

George D. Baldwin
INVENTOR.

BY *Clarence A. O'Brien*
*and Harvey B. Jacobson*
Attorneys

United States Patent Office 3,049,613
Patented Aug. 14, 1962

3,049,613
VEHICLE LIGHT
George D. Baldwin, Jamestown, N.Y., assignor to Truck-Lite Co., Inc., Jamestown, N.Y., a corporation of New York
Filed July 18, 1958, Ser. No. 749,390
5 Claims. (Cl. 240—7.1)

This invention relates to vehicle lights of the type known as clearance or position lights which are used for indicating the position and for delineating the configuration of a vehicle body. Vehicle lights of this type are used in large numbers on trucks, trailers, and sometimes on objects projecting into or arranged in close proximity to the road.

Various constructions for vehicle lights of this type have been suggested, but it was found by applicant that a very simple, serviceable, reliable and inexpensive construction could be obtained by enclosing a light bulb in a completely closed vapor and moisture tight chamber formed within a light bulb carrying body of synthetic resinous plastic, the front of which forms a light dispersing, usually colored lens. It is desirable that the vehicle light, if made entirely of resinous plastic, should project slightly from the wall of the vehicle so as to emit light laterally, as in this way the exact dimensions of the vehicle can be more easily gauged and the turning of the vehicle and its movement during turning can be more easily observed.

Vehicle lights of this type made of molded synthetic resinous plastic consisting of parts welded together and enclosing a chamber containing the light bulb are inexpensive; they may be made expendable and may be discarded when the light bulb gives out. Obviously, however, it may be of advantage while retaining the closed chamber to make the vehicle light usable also for a longer time so that the light bulb can be replaced, broken contacts may be repaired, and the lens and other parts may be cleaned more thoroughly. Further, in the event that the lamp bulb carrier can be used for a longer time, resinous plastics of better quality and higher transparency may be used.

The invention essentially consists in a construction which, on the one hand, permits to retain the advantages of the closed, moisture and vapor tight light bulb chamber surrounding the light bulb nut, on the other hand, also permitting access to the said bulb chamber.

In order to produce an accessible, but normally tightly closed moisture and vapor tight light bulb chamber, the lens body is detachable from the holder casing carrying the light bulb, but is held on said body without external additional sealing means by the interengagement under tension of suitably shaped recesses and projecting portions of the lens body and lamp holder casing, which engagement produces an elastic tension exercising considerable pressure holding the parts tightly together.

The engagement is thus produced by means of a clamping or snap action and the tight sealing is produced by the pressure due to elastic deformation exercised on two different and spaced surfaces which are separated by an air space. Since both these surfaces are under considerable pressure, a tight seal is obtained without special or additional sealing means. The removal of the detachable lens body or replacing of the said lens body is a simple hand manipulation consisting either in pressing down or in lifting the lens body from the holder casing which does not require any special tools and which can be performed instantaneously.

The main object of the invention is thus to produce a vehicle light consisting essentially of a resinous transparent plastic in which a vapor-tight, moisture-tight and dust-tight chamber containing the electric bulb is formed between a lens body and a light bulb holder, the lens body, when fastened on the holder, sealing the chamber surrounding the light bulb by interengaging parts under elastic tension. The lens body is thus separable from and engageable with the lamp casing by a snap action producing automatically, by means of the elastic tension, the necessary high sealing pressure of the parts against each other.

A further object of the invention consists in producing a seal in the manner above stated with a shape and arrangement which so directs the light rays that the sealing engagement does not disturb the over-all illumination of the vehicle light.

Further objects of the invention will be apparent from the following detailed specification.

The invention is illustrated in the accompanying drawing by way of examples only. It will be understood that modifications other than those illustrated will readily occur to those skilled in the art and that therefore a departure from the embodiment of the invention which is illustrated is not necessarily a departure from the principle of the invention.

In the drawings:

FIGURE 1 is a perspective view illustrating the arrangement of vehicle lights of this type on the body of a vehicle, more specifically on two sides at right angles to each other, which vehicle lights may, however, both be observed simultaneously.

FIGURE 2 is an elevational view of the two essential parts of a lamp bulb casing, housing an electric lamp bulb.

FIGURE 3 is an elevational sectional view of the vehicle light, the section being taken along the line 3—3 of FIGURE 1.

FIGURE 4 is a fragmentary sectional view, the section being taken along line 4—4 of FIGURE 2.

FIGURES 9 and 10 are diagrams illustrating the distribution of the light rays with straight or unsuitably curved profiles of the flanges of the lens body (FIG. 10) and with a curved flange portion producing uniform over-all illumination.

Figure 5:
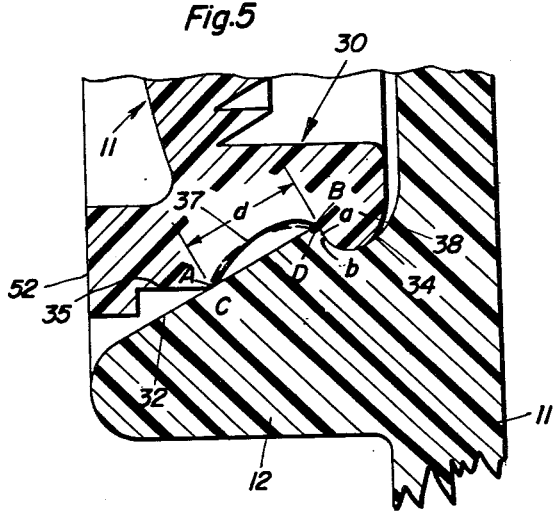
FIGURE 5 is an elevational sectional fragmentary view on an enlarged scale of the interengaging parts of the lens body and light bulb holder when under tension.

According to the invention, a light bulb 20 is enclosed in a vapor-tight chamber 9 (FIGURE 3) enclosed within a body of transparent synthetic resinous plastic which is vapor and moisture tight and is formed between a lens body 11 and a base member 10, which two members together form a casing housing said light bulb 20. The front of the casing is formed by the said lens body which is attachable and detachable by a simple manipulation which may be described as a snap action. When the lens body has been seated by the snap action, a complete moisture and vapor tight closure of the chamber is maintained. The fastening of the lens body 11 on the base 10, by snap action, permits practically an instantaneous mounting or dismounting of the front wall of the chamber and thus permits the replacement of a burned out light bulb, the repair of contacts, a thorough cleaning of the lens body, etc.

To attach the vehicle light forming, for instance, the clearance light of a truck or trailer, the base 10 of the casing is provided with lateral flanges 14, as illustrated in FIGURE 1. These laterally projecting flanges 14 are provided with bores or openings 17 through which screw bolts may be passed for fixing the casing on the side walls of a vehicle.

In the center of the base 10 of the casing, an inwardly projecting socket portion 15 is arranged which is joined to the remainder of the base 10 by a conical section 16.

The above mentioned parts including the lens body 11 are made of a molded transparent resinous plastic which may be suitably colored.

The socket portion of the base contains a lamp socket 18 made of metal into which the lamp bulb 20 is inserted. The lamp bulb 20, as well known, usually has a central contact and a surrounding socket contact on the lamp base which engages the socket. As most lamp circuits are operated by only one line wire while the other line wire is grounded, a metal strip 21 may be held on the base member which is in contact with the socket 18 on one end and with a little metal sleeve 22 lining one of the openings 17 through which said screw bolts fixing the base member pass at the other end. The screw bolt passing through the opening 17 and in contact with the metal sleeve 22 thus produces a grounding of the circuit if the vehicle body is of metal; if the vehicle body should not be of metal, the screw bolt end surface in the interior is used as a point of attachment for a wire or metal strip leading to a suitable metallic part of the vehicle.

The central contact 25 of the lamp bulb is in contact with the contact button 24 carried by an insulating plug 28 of conventional construction held in the socket. Said button is energized by means of the wire 26 leading to the said button 24.

The lens body 11, formed of a transparent resinous colored plastic, essentially comprises a central curved, preferably spherical lens surface with serrations on the inside surrounding a central portion which is shaped as a bi-convex lens. This arrangement, as well known, is conventional. At its edge, the lens body 11, however, carries an annular flange 30 projecting from the lens body outwardly and inwardly. This flange 30 cooperates with the annular projecting flange 12 of the base member 10 to form simultaneously a vapor and moisture-tight seal and a secure mechanical attachment which cannot be dislodged by vibrations and shocks, such as occur constantly on a vehicle in motion.

The shock and vibration proof mechanical fixation and vapor and moisture-tight sealing of the bodies 11 and 10 is obtained by the special shape of the engaging portions of these parts and without any additional external sealing means. It will be understood, however, that in view of the fact that the two bodies form part of a vehicle light which is to be illuminated on all sides over a very wide angle approximating 180°, certain difficulties arise. The mechanical fixation is apt to interfere with the illumination. Obviously, external opaque sealing means are excluded as they would cast shadows. Therefore, sealing must be performed solely by the interengagement of transparent plastic parts, and any mechanical means not consisting of resinous plastic are excluded. This sealing must be performed by parts of suitable shape as otherwise the refraction in the plastic will cause deflection of the rays, producing shadows.

Figure 6:
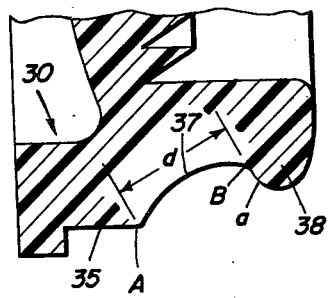
FIGURE 6 is a similar view of the lens body alone showing the latter in an undeformed state.

FIGURES 5 to 8 illustrate two different methods of obtaining simultaneous mechanical fixation and sealing without impairing the light emission. According to the mode of fixation illustrated in FIGURES 5 and 6, the annular flange 12 of the member 10 is provided with a conical surface 32 on its inside which terminates near the foot of the flange in an annular groove 34 of approximately semi-circular cross-section. The cooperating flange 30 of the lens body 11 has a stepped cylindrical portion 35 reaching down to the edge A. Between the points A and B the profile of the flange 30 shows an inwardly curved recess, the curve being preferably part of a circle, this portion being designated by 37. At point B, this recess joins an outwardly projecting collar 38 of approximately semi-circular cross-section (FIGURE 6).

An essential point for this seal is that the edge marked A at the bottom of the stepped cylindrical portion 35 must rest firmly on the conical surface, the point on the conical surface on which the edge A rests being designated by C. The distance $d$ between A and B on a lens body which is not interengaged with the flange is slightly shorter than the distance between the point C on which the edge A is supposed to rest and the edge D on which the conical surface joins the groove 34. This produces a double effect upon engagement of the lens body with the flange. On the one hand, the lens body with A as the fixed point of leverage tends to pull the lens out of the housing formed by the flange 30. This presses the surface $a$ firmly against the surface $b$ of the groove 34, thus causing the lens to be held firmly under considerable pressure between the two surfaces $a$ and $b$.

As the distance $d$ from A to B when flange 30 is not under stress is somewhat shorter than the distance C—D, the ledge A is firmly pressed against the conical surface when flange 30 is compressed by conical surface 32 along its entire circumference. Thus a perfect seal is obtained consisting of an annular contact under pressure and a contact between the surfaces $a$ and $b$ with an air space in between. It will be clear that no vapor, no moisture and no dust can pass such a seal, as the pressure is considerable.

The pressure which is due to the elastic deformation of the resinous plastic is considerable and is automatically produced as soon as the lens flange 30 is squeezed into the position shown in FIGURE 5. The pressure is usually so heavy that it is necessary to provide a slot 40 in the flange 30 into which a tool—for instance, a screwdriver—may be inserted. By means of this tool acting as a lever, the lens body can be easily lifted out of engagement. Once lifted so that the collar 38 is disengaged from the groove 34, the lens body will snap out of engagement automatically.

Figure 7:
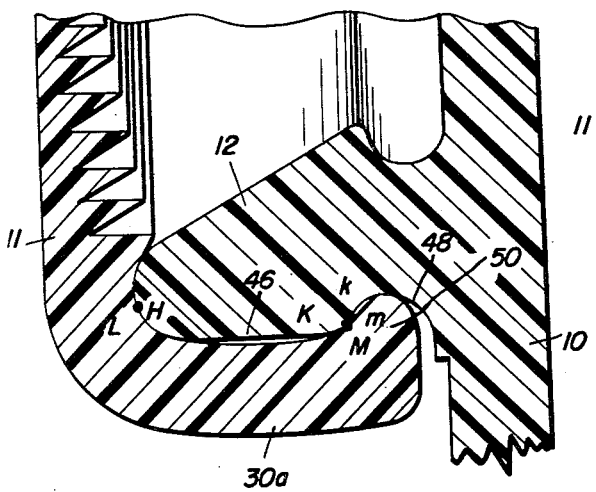
FIGURE 7 is a view similar to FIGURE 6 illustrating another modification of the lens body.
Figure 8:
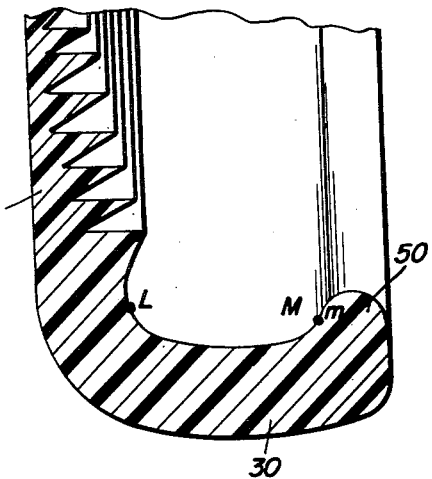
FIGURE 8 is a fragmentary sectional elevational view of the lens body illustrated in FIGURE 7 in a non-tensioned state.

While the arrangement illustrated in FIGURES 5 and 6 shows the lens body clamped on the inside of the flange 12, FIGURES 7 and 8 are a modification of this arrangement in which the lens body is clamped on the outside of the flange.

The upstanding flange 12 of the base 10 in this modification has a more or less straight outer edge 46 which ends in a groove 48. The point of junction of the groove is designated by K. The lens body is provided with a downwardly projecting flange 30a which at its end has an inwardly projecting bead-like shoulder 50. This shoulder is joined to the flange at M. When the flange 30a of the lens body engages the groove 48, the lens body is applied under pressure at L against the corresponding portion H of the flange 12. Between the points H and K and L and M, respectively, there is a relation similar to that existing between the points A and B, C and D of FIGURES 5 and 6. The distance L—M is slightly shorter than the distance H—K. The lens body with H as its point of leverage pulls the surfaces $k$ and $m$ towards each other under considerable pressure which somewhat straightens the slightly curved flange 30a. Simultaneously, the flange 30a which is under considerable stress tends to force the bead-like shoulder 50 inwardly.

A very strong action thus occurs pressing the parts against each other. Due to the elastic deformation, this results in a double seal at H—L and K—M, respectively, between which there may be some air space.

This construction which is based solely on the interengagement of parts of the transparent plastic has the further advantage that the full surface of the lens is illuminated. This result cannot be obtained with other constructions even if only transparent plastic is used.

Referring to the diagram of FIGURE 10, a construction with a straight flange above the collar 38 is shown by way of example. Constructions of this type, also when provided with curved flanges, produce a dark ring on the surface 52 so that under a certain angle no light is seen. This will be clear from the fact that the rays diverge as shown in FIG. 10. The lights of a turning vehicle could not be followed and would disappear, and would only reappear again after the vehicle had turned through a predetermined angle. Such a dark ring has therefore marked disadvantages.

However, the interposition of an arcuate zone 37 of suitably chosen curvature corrects this by producing on the inside of the curved portion total reflection, deflecting the rays towards the surface 52, which is the zone which would otherwise form the dead zone. It has been determined experimentally that an inward curving along a curve generally forming part of a circle is necessary for the elimination of such a dead dark zone even in the event that only interengaging parts of transparent resinous plastic are used.

According to the invention, thus a vehicle light of the type having a lamp bulb enclosed in a completely closed moisture-tight chamber is produced in which the chamber is rendered accessible by fastening the lens body on its base by means of a snap action clamping the lens body to the base plate of the casing and producing contact under considerable pressure at two points separated by an air filled space.

It will be clear that constructions other than those illustrated in the drawing will produce the same action and that, therefore, unessential changes may be made without in any way departing from the essence of the invention as defined in the annexed claims.

What is claimed as new is as follows:

1. A vehicle light for use as a clearance or position light on a vehicle body comprising a casing enclosing a vapor and moisture tight chamber, a light bulb housed within the said chamber, the said casing consisting of two bodies made exclusively of transparent resinous plastic, one of said bodies being a lens body and the other being a light bulb holder, an axial flange on said lens body projecting inwardly and provided with a radially extending collar, a circumferential axial flange on said light bulb holder provided with a radially extending groove on the inner surface thereof, said collar engaging said groove upon elastic deformation of the engaging parts producing elastic tension, securing the parts to each other by a snap action, said circumferential axial flange being provided with a conical inner surface extending from said groove outwardly and said axially extending flange of said lens body being provided with a stepped cylindrical surface forming at least one annular ridge engaging said conical inner surface.

2. The combination of claim 1 wherein said lens body defines a flat radially extending outermost surface.

3. The combination of claim 1 wherein said circumferential axial flange is provided with a cylindrical outer surface.

4. A vehicle light for use as a clearance or position light on a vehicle body comprising a casing enclosing a vapor and moisture tight chamber, a light bulb housed within the said chamber, the said casing consisting of two bodies made exclusively of transparent resinous plastic, one of said bodies being a lens body and the other being a light bulb holder, an axial flange on said lens body projecting inwardly and provided with a radially extending collar, a circumferential axial flange on said light bulb holder projecting outwardly and provided with a radially extending groove on the inner surface thereof and a surface of rotation at a distance from the groove, said axial flange of said lens body being further provided with a surface spaced from the collar a distance substantially equal to the distance separating the surface of rotation from the groove, said surfaces on the two flanges being of equal diameter and contacting each other upon engagement of the collar on one axial flange with the groove on the other axial flange under elastic tension and deformation of the flanges, the two spaced engaging and contacting surfaces providing a moisture and vapor tight seal between the two bodies enclosing the chamber, the surface of rotation on said axial flange on the light bulb holder being conical and extending from the groove outwardly and wherein the axially extending flange of the lens body is provided with a stepped cylindrical surface, the extreme inward edge of which is separated from the collar by a recessed portion and is adapted to rest on the conical surface of the axial flange of the light bulb holder, the distance between the extreme inward edge and the collar on one flange being slightly smaller than the distance between the circle on which the said extreme inward edge rests and the groove on the other flange, the elastic tension produced by the engagement of the groove and collar thus drawing the collar outwardly and simultaneously drawing the collar radially into the groove.

5. A vehicle light for use as a clearance or position light on a vehicle body comprising a casing enclosing a vapor and moisture tight chamber, a light bulb housed within the said chamber, the said casing consisting of two bodies made exclusively of transparent resinous plastic, one of said bodies being a lens body and the other being a light bulb holder, an axial flange on said lens body projecting inwardly and provided with a radially extending collar, a circumferential axial flange on said light bulb holder projecting outwardly and provided with a radially extending groove on the inner surface thereof and a surface of rotation at a distance from the groove, said axial flange of said lens body being further provided with a surface spaced from the collar a distance substantially equal to the distance separating the surface of rotation from the groove, said surfaces on the two flanges being of equal diameter and contacting each other upon engagement of the collar on one axial flange with the groove on the other axial flange under elastic tension and deformation of the flanges, the two spaced engaging and contacting surfaces providing a moisture and vapor tight seal between the two bodies enclosing the chamber, the surface of rotation on said axial flange on the light bulb holder being conical and extending from the groove outwardly, the axially extending flange of the lens body being provided with a stepped cylindrical surface, the extreme inward edge of which is separated from the collar by a recessed portion and is adapted to rest on the conical surface of the axial flange of the light bulb holder, the distance between the extreme inward edge and the collar on one flange being slightly smaller than the distance between the circle on which the said extreme inward edge rests and the groove on the other flange, the elastic tension produced by the engagement of the groove and collar thus drawing the collar outwardly and simultaneously drawing the collar radially into the groove, the recessed portion between the collar and the edge of the cylindrical stepped portion of the lens body flange being curved and having a curvature which produces total reflection on its inner side of the rays coming from the light bulb in a substantially radial direction, deflecting them towards the peripheral portion of the lens body, thus avoiding the formation of dark, non-illuminated, peripheral zones on the lens body.

References Cited in the file of this patent

UNITED STATES PATENTS

| | | |
|---|---|---|
| 2,099,444 | Langdon | Nov. 16, 1937 |
| 2,428,167 | Linton | Sept. 30, 1947 |
| 2,543,226 | Briggs | Feb. 27, 1951 |
| 2,574,905 | Bonanno | Nov. 13, 1951 |
| 2,734,125 | Morris | Feb. 7, 1956 |
| 2,812,423 | Penna | Nov. 5, 1957 |
| 2,826,680 | Cline | Mar. 11, 1958 |
| 2,830,171 | Buck | Apr. 8, 1958 |
| 2,853,595 | Baldwin | Sept. 23, 1958 |
| 2,855,498 | Knapp | Oct. 7, 1958 |
| 2,860,233 | Johnson | Nov. 11, 1958 |
| 2,903,570 | Worden | Sept. 8, 1959 |